(12) United States Patent
LeBlanc

(10) Patent No.: US 7,262,935 B2
(45) Date of Patent: Aug. 28, 2007

(54) TOP COVER ATTACHED SINGLE PLATE FLUID DYNAMIC BEARING MOTOR

(75) Inventor: Jeffry A. LeBlanc, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 146 days.

(21) Appl. No.: 10/696,755

(22) Filed: Oct. 29, 2003

(65) Prior Publication Data

US 2005/0007693 A1    Jan. 13, 2005

Related U.S. Application Data

(60) Provisional application No. 60/424,959, filed on Nov. 7, 2002.

(51) Int. Cl.
*H02K 7/08* (2006.01)
(52) U.S. Cl. ..................... 360/99.08; 310/90
(58) Field of Classification Search ............ 360/99.08, 360/97.02, 98.08; 310/90; 384/114, 110
See application file for complete search history.

(56) References Cited

U.S. PATENT DOCUMENTS

| | | | |
|---|---|---|---|
| 5,634,724 A | 6/1997 | Zang et al. | |
| 5,847,479 A | 12/1998 | Wang et al. | |
| 6,066,903 A | 5/2000 | Ichiyama | |
| 6,069,768 A * | 5/2000 | Heine et al. | 360/99.08 |
| 6,071,014 A | 6/2000 | Lee et al. | |
| 6,181,039 B1 * | 1/2001 | Kennedy et al. | 310/90 |
| 6,236,535 B1 | 5/2001 | Gilliland | |
| 6,249,400 B1 * | 6/2001 | Hong et al. | 360/97.02 |
| 6,292,328 B1 * | 9/2001 | Rahman et al. | 360/99.08 |
| 6,339,515 B2 * | 1/2002 | Lee et al. | 360/99.08 |
| 6,394,654 B1 * | 5/2002 | Khan et al. | 384/114 |
| 6,404,087 B1 | 6/2002 | Ichiyama | |
| 6,900,567 B2 * | 5/2005 | Aiello et al. | 310/90 |
| 7,042,125 B2 * | 5/2006 | LeBlanc et al. | 310/90 |
| 2003/0214193 A1 | 11/2003 | Aiello et al. | |

FOREIGN PATENT DOCUMENTS

JP        2000014079 A    *    1/2000

OTHER PUBLICATIONS

Grantz, et al., "Motor Having A Fluid Dynamic Bearing With An Asymmetric Seal" U.S. Appl. No. 10/641,642 filed Aug. 14, 2003.

* cited by examiner

*Primary Examiner*—Tianjie Chen
(74) *Attorney, Agent, or Firm*—Morrison & Foerster LLP

(57) ABSTRACT

In one aspect of the invention, a motor having improved stiffness is provided. In one embodiment, the motor includes a stationary shaft, a hub, a thrust plate and a counter plate. The thrust plate is coupled to the shaft. The hub is rotatable about a central axis of the shaft. The counter plate is coupled to the hub and has the shaft extending therethrough. The counter plate and the thrust plate define at least a portion of a fluid dynamic bearing, wherein at least a portion of counter plate and the thrust plate form a capillary seal therebetween. The capillary seal enhances motor performance by providing a fluid reservoir for the fluid dynamic bearing, allowing fluid to be added to the hydrodynamic bearing without motor disassembly and providing a passage for air to escape from between the bearing surfaces. In one embodiment, the motor is particularly suitable for disc drive applications.

18 Claims, 4 Drawing Sheets

TOP COVER ATTACHED SINGLE PLATE FLUID DYNAMIC BEARING MOTOR

CROSS-REFERENCE TO RELATED APPLICATIONS

This application claims benefit of U.S. Provisional Application No. 60/424,959, entitled TOP COVER ATTACHED SINGLE PLATE FDB MOTOR, filed Nov. 7, 2002 by LeBlanc, which is hereby incorporated by reference in its entirety.

FIELD OF THE INVENTION

The invention relates to the field of fluid dynamic bearing motors of the type used in concert with high-speed spindle elements. More specifically, embodiments of the invention relate to fluid dynamic bearing motors utilized in a disc drive system.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft and a sleeve into which the shaft is inserted. In order to facilitate relative rotation of the shaft and sleeve, one or more bearings are usually disposed between them.

Over the years, storage density has tended to increase, and the size of the storage system has tended to decrease. This trend has lead to greater precision and lower tolerance in the manufacturing and operating of magnetic storage disc drives.

The bearing assembly that supports the storage disk is of critical importance. One bearing design is a fluid dynamic bearing. In a fluid dynamic bearing, a lubricating fluid such as air or liquid provides a bearing surface between a fixed member of the housing and a rotating member of the disk hub. In addition to air, typical lubricants include gas, oil, or other fluids. The relatively rotating members may comprise bearing surfaces such as cones or spheres, or may alternately comprise hydrodynamic grooves formed on the members themselves. Fluid dynamic bearings spread the bearing surface over a large surface area, as opposed to a ball bearing assembly, which comprises a series of point interfaces. This bearing surface distribution is desirable because the increase bearing surface reduces wobble or run-out between the rotating the fixed members. Further, the use of fluid in the interface area imparts damping effects to the bearing, which helps to reduce non-repeat run-out. Thus, fluid dynamic bearings are an advantageous bearing system.

However, because of the lack of a mechanical connection between both ends of the shaft and support structures of the disc drive, stiffness of the rotating system can be an issue. Spindle motors having fluid dynamic bearing (FDB) designs with top cover attachment have associated problems with sealing the bearing fluid, coupling of bearing pressures, and purging ingested air.

FIG. 4 depicts a typical low cost FDB spindle motor 400 utilized in conventional hard disc drive systems. The FDB motor 400 includes a rotor 408 having one or more media discs 410 coupled thereto. The rotor 408 is disposed on a rotor shaft 406 that extends in a cantilevered orientation from a housing base 412. A conventional dual sided thrust plate bearing 402 and a counter plate 404 encloses the distal end of the rotor shaft 406 to facilitate rotation of the rotor 408 about the rotor shaft 406. As this configuration fixedly supports only one end of the shaft 406, the potential stiffness of the FDB motor 400 is limited. Thus, this type of motor may not be suitable for many high performance applications having high inertial loads or large rotating mass.

Thus, the problem presented is to increase motor stiffness to enhance disc drive performance by supporting both ends of the motor shaft while maintaining full bearing fluid levels in all bearing components.

SUMMARY OF THE INVENTION

In one aspect of the invention, a motor having improved stiffness is provided. In one embodiment, the motor includes a stationary shaft, a hub, a thrust plate and a counter plate. The thrust plate is coupled to the shaft. The hub is rotatable about a central axis of the shaft. The counter plate is coupled to the hub and has the shaft extending therethrough. The counter plate and the thrust plate define at least a portion of a fluid dynamic bearing, wherein at least a portion of counter plate and the thrust plate form a capillary seal therebetween axially beyond the thrust bearing.

In another embodiment, the motor includes a base, a cover, a stationary shaft, a hub and a stator. The shaft is coupled at a first end to the base. A fluid dynamic bearing interconnects the hub with the stationary member and allows the hub to rotate about the stationary shaft. The fluid dynamic bearing includes a thrust plate coupled to the shaft and counter plate. A divergent capillary seal is formed between the thrust plate and counter plate thereby allowing the shaft to extend beyond the counter plate and be coupled to the cover at a second end, thereby providing increase motor stiffness over conventional designs.

In another embodiment, the capillary seal bounds a portion of the fluid dynamic bearing, while providing a fluid reservoir and port that allows additional fluid to be added to the fluid dynamic bearing without motor disassembly. The capillary seal additionally prevents fluid leakage while the motor is at rest. The invention is particularly suitable for disc drive applciations.

BRIEF DESCRIPTION OF THE DRAWINGS

The teachings of the invention can be readily understood by considering the following detailed description in conjunction with the accompanying drawings, in which.

To facilitate understanding, identical reference numerals have been used, wherever possible, to designate identical elements that are common to the figures.

DETAILED DESCRIPTION

The invention comprises a spindle motor for a disc drive data storage device wherein the rotor shaft is supported from each end to reduce vibrations and/or acoustic levels in the storage device. In another aspect of the invention, a spindle motor for a disc drive data storage device is provided having an improved fluid dynamic bearing. Although the invention is described with reference to a disc drive application, it is contemplated that the inventive aspects may be utilized in other types of motors and motor applications having fluid dynamic bearings.

Figure 1:
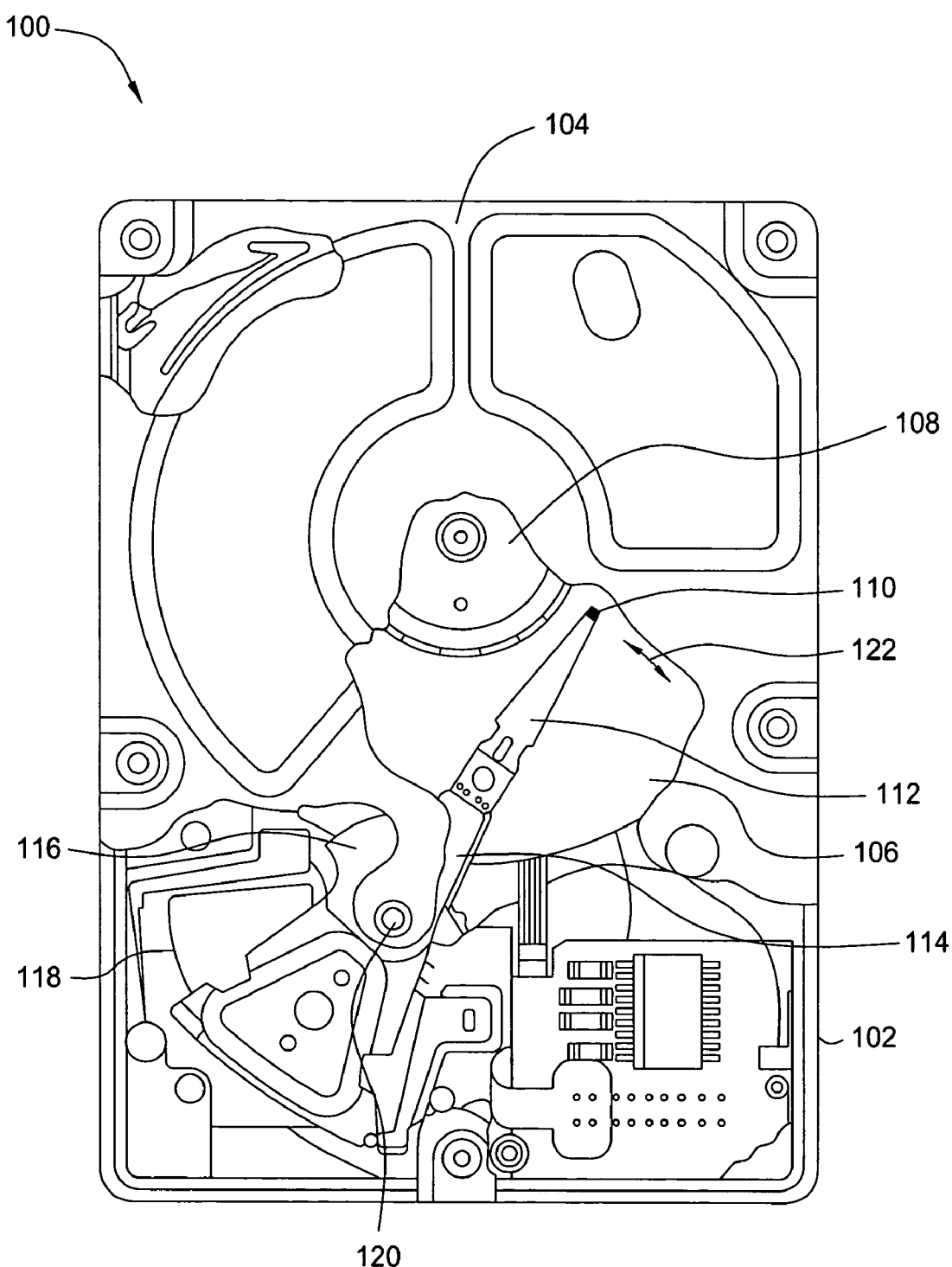
FIG. 1 is a top plan view of a disc drive data storage device, in accordance with the invention.

FIG. 1 is a plan view of a disc drive 100 adapted to benefit from the invention. The disc drive 100 includes a housing base 102 and a top cover 104. The housing base 102 is combined with top cover 104 to form a sealed environment to protect the internal components of the disc drive 100 from contamination by elements from outside the sealed environment.

The base and top cover arrangement shown in FIG. 1 is common in the industry. However, other arrangements of the housing components have been frequently used, and the invention is not limited to the configuration of the disc drive housing.

The disc drive 100 further includes a disc pack 106 that is mounted for rotation on a spindle motor (not shown) by a disc clamp 108. The disc pack 106 includes at least one or more discs that are mounted for co-rotation about a central axis. Each disc surface has an associated head 110 that is mounted to disc drive 100 for communicating with the disc surface. In the example shown in FIG. 1, heads 110 are supported by flexures 112 that are in turn attached to head mounting arms 114 of an actuator body 116. The actuator shown in FIG. 1 is of the type known as a rotary moving coil actuator and includes a voice coil motor (VCM), shown generally at 118. The voice coil motor 118 rotates actuator body 116 with its attached heads 110 about a pivot shaft 120 to position heads 110 over a desired data track along an arcuate path 122. While a rotary actuator is shown in FIG. 1, the invention is also useful in disc drives having other types of actuators, such as linear actuators.

Figure 2:
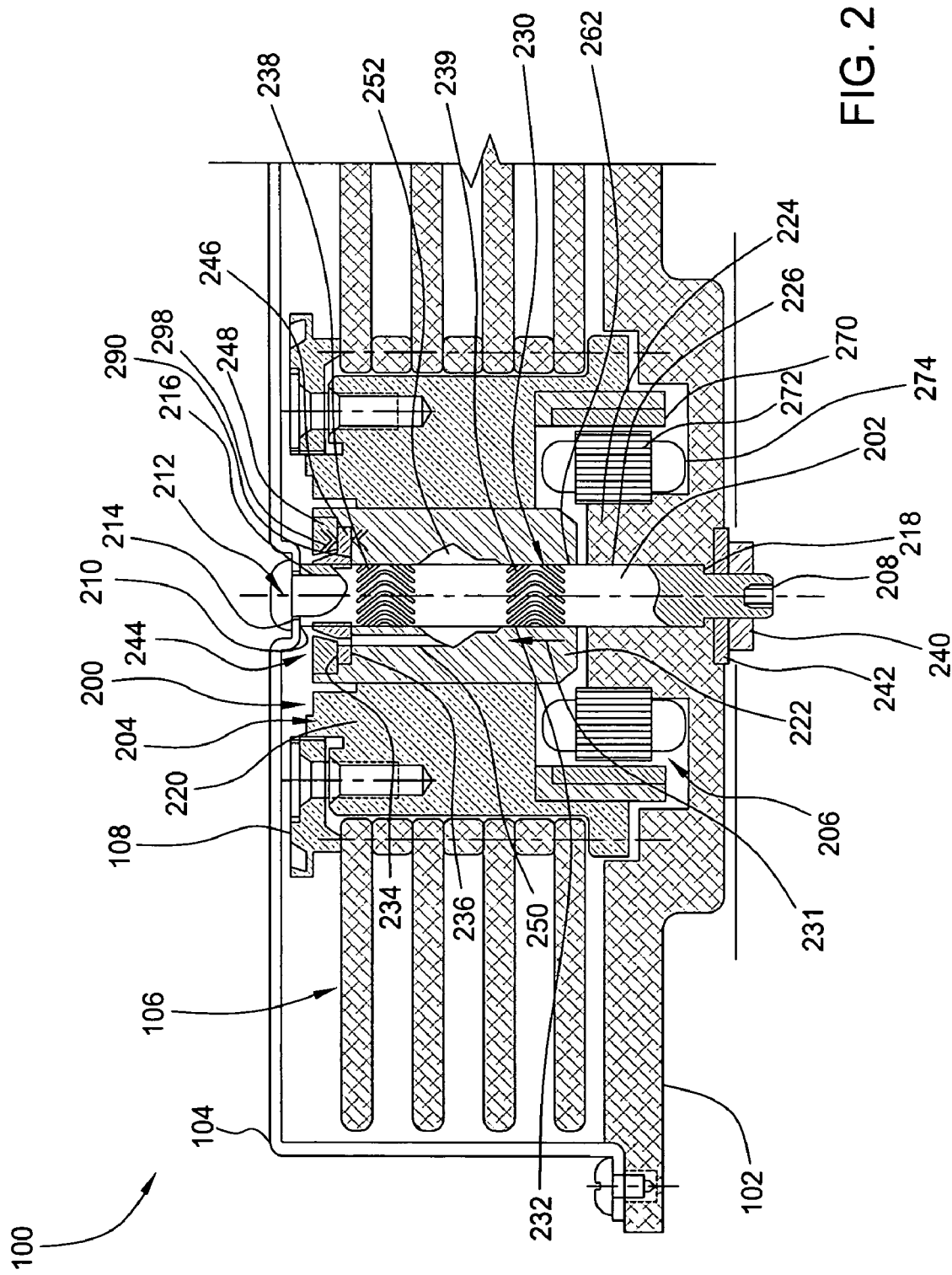
FIG. 2 is a partial sectional view of an isolated fluid dynamic bearing spindle motor in accordance with the invention.

FIG. 2 is a partial sectional view of one embodiment of a fluid dynamic bearing spindle motor 200 having a fluid dynamic bearing 230 for rotating the disc pack 106 of the disc drive 100 in accordance with the invention. Spindle motor 200 includes a stationary member (shaft) 202, a hub 204 and a stator 206. The shaft 202 is supported at least at one end, and in the embodiment depicted in FIG. 2, is secured at a first end 208 and at a second end 210 to provide a rigid axis about which the hub 204 is rotated during operation. In one embodiment, the first end 208 of the shaft 202 is coupled to the base 102 and the second end 210 of the shaft 202 is coupled to the cover 104. The ends 208, 210 may be coupled to the base 102 and cover 104 by any number of means, including rivets, welding, staking, brazing, fastening (such as screws or nuts), bonding, and clamping, among other methods of securing.

In the embodiment shown in FIG. 2, the first end 208 of the shaft 202 is disposed through a passage 226 formed through a boss 224 extending upward into the disc drive 100 from the housing 102. A nut 240 and a washer 242 are threaded onto a portion of the shaft 204 extending beyond the housing 102. To further enhance the rigidity of the interface between the shaft 204 and the housing 102, the shaft 204 may include a step 218 that abuts and is drawn tight against the interior of the housing 102 by the nut 240. The second end 210 of the shaft 202 is fixed and attached to the cover 104 by a fastener 212 extending through a hole 214 formed in the cover 104 and engaging a hole 216 formed coaxially in the shaft 202.

Figure 3:
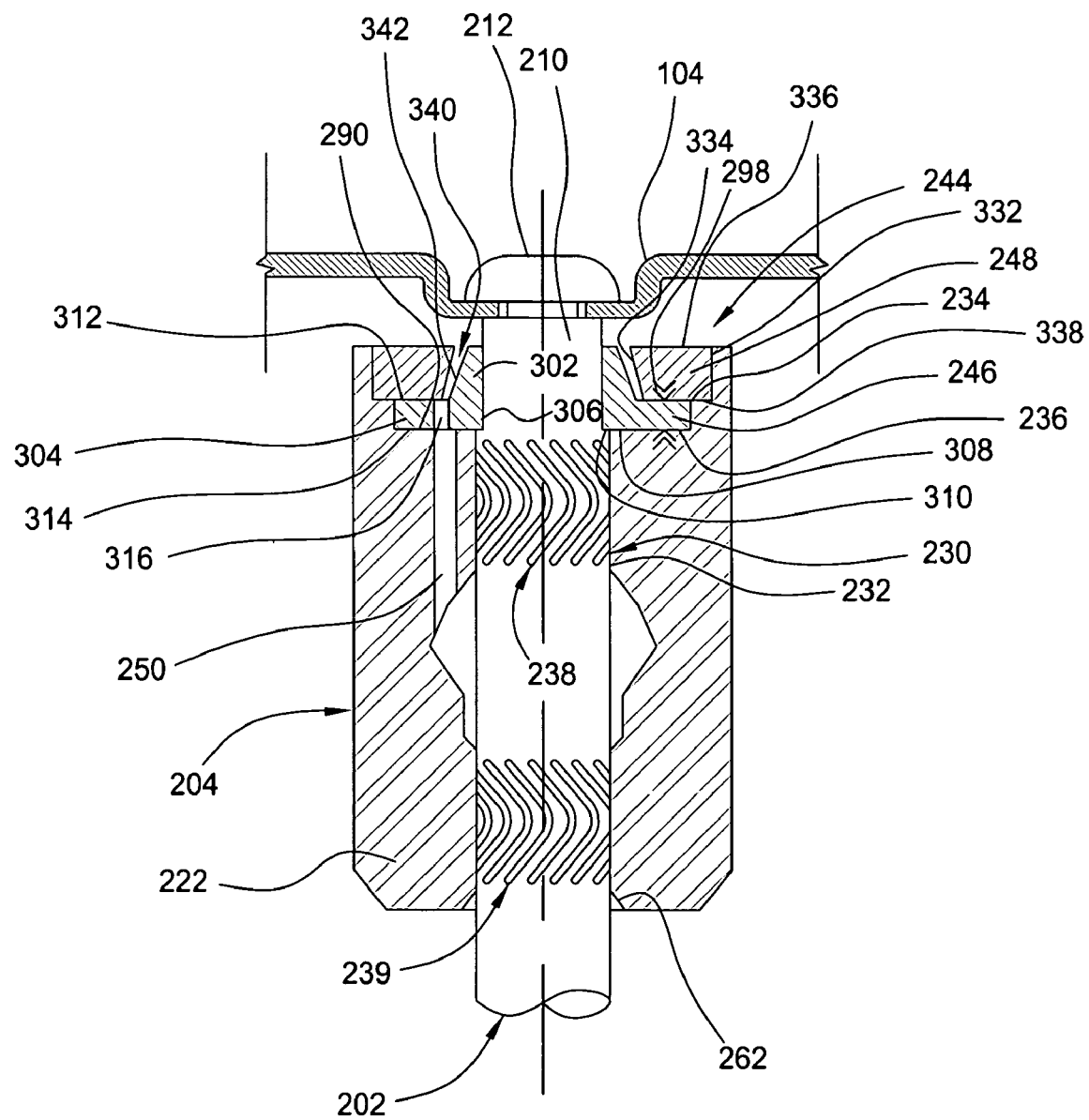
FIG. 3 is sectional view of one embodiment of a thrust bearing of the motor of FIG. 2.
Figure 4:
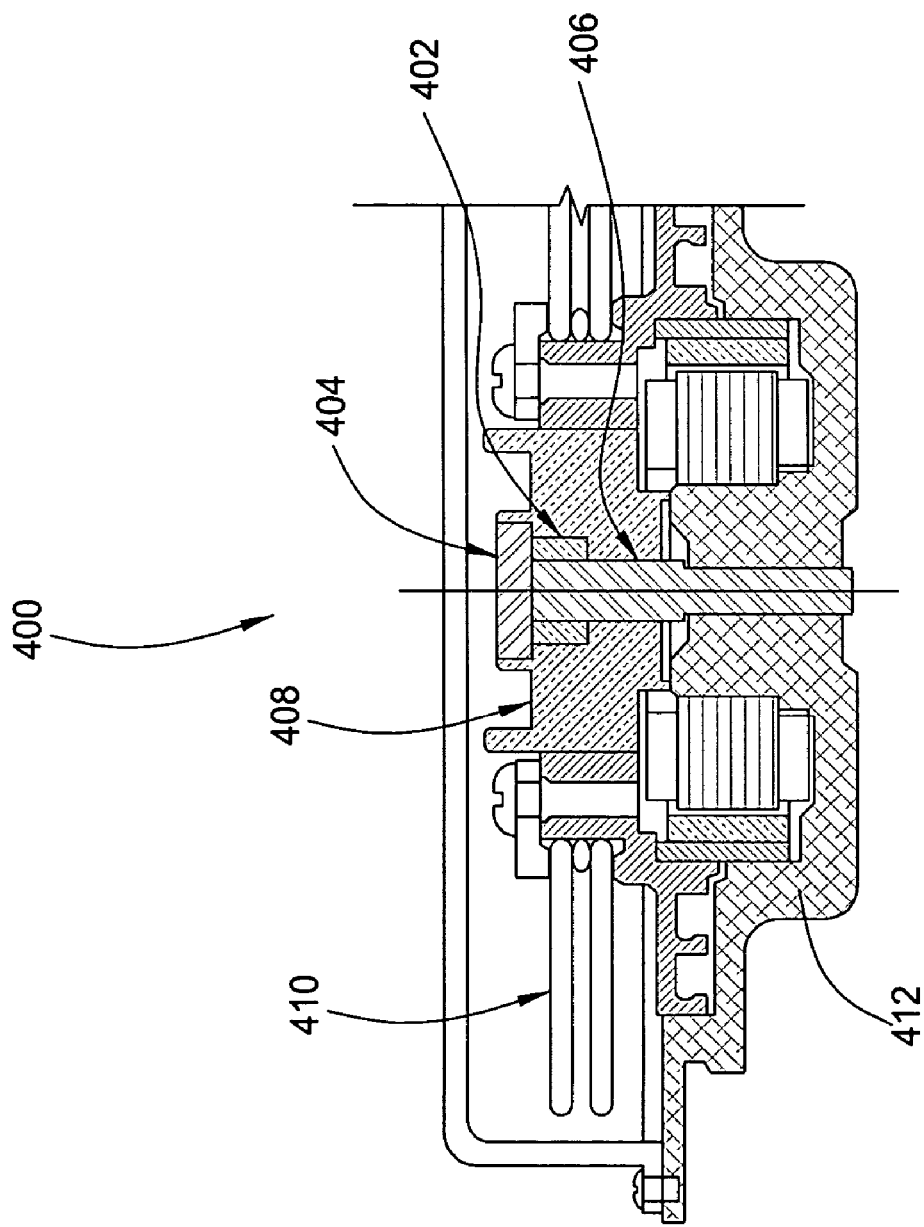
FIG. 4 depicts a typical low cost fluid dynamic bearing (FDB) spindle motor utilized in conventional hard disc drive systems.

Grooves 238, 239 are formed on at least one of the shaft 202 and hub 204 to provide fluid pumping within the fluid dynamic bearing 230. The lower grooves 239 at the first end 208 of the shaft 202 are asymmetric to the upper grooves 238 disposed proximate the second end 210 of the shaft 202. The asymmetry between the upper and lower grooves 238, 239 pumps fluid in an upward direction (as shown by arrow 231) along the shaft 202 in bearing 230 as the lower grooves 239 in the lower journal functions as part of a pumping seal 262. Alternatively, the pumping seal may defined by a separate grooved section (not shown) between the radial working region 232 of the bearing 230 and the lower end of the sleeve/shaft gap. Additionally, a capillary seal may be defined between divergent surfaces of the shaft 202 and the hub 204 (as seen in FIG. 3) to further provide fluid retention.

The hub 204 is disposed around the shaft 202 and includes a disc carrier member 220 concentrically coupled around a sleeve 222. The disc carrier member 220 supports the disc pack 106 (shown in FIG. 1) for rotation about shaft 202. The disc pack 106 is coupled to the disc carrier member 220 by the disc clamp 108 (also shown in FIG. 1).

A permanent magnet 270 with a plurality of magnet poles is attached to the hub 204, with the hub 204 and magnet 270 acting as a rotor for the spindle motor 200. In the embodiment depicted in FIG. 2, the magnet 270 is coupled to an inner facing flange of the disc carrier member 220.

The stator 206 is coupled to the base 102 radially inward of the magnets 270. The stator 206 is generally formed of a stack of stator laminations 272 and associated stator windings 274. The stator 206 is generally retained in the base 102 by fasteners, adhesives or other conventional methods. In the embodiment illustrated in FIG. 2, the stator 206 is coupled to the boss 224 extending upward into the interior of the disc drive 100 from the base 102. The rotor is rotated about the shaft 202 by sequentially energizing the stator winding 274 to alternatively repel and attract the magnetic poles of the magnet 270, thereby creating a rotational force.

Rotation of the hub 204 about the shaft 202 is facilitated by the fluid dynamic bearing 230 formed therebetween. The fluid dynamic bearing 230 facilitates high speed rotation of the hub 202 around a central axis of the shaft 202 by providing a cushion of fluid, such as air, oil and the like, between the moving parts. In the embodiment depicted in FIGS. 2 and 3, the fluid dynamic bearing is illustratively and hereinafter referred to as a hydrodynamic bearing 230, although an air bearing may alternatively be utilized.

The hydrodynamic bearing 230 includes a radial working region 232 and axial working regions 234 and 236. The radial working region 232 is defined between the inner diameter of the sleeve 222 and the outer diameter of the shaft 202. At least one of the shaft 202 and sleeve 222 includes the pumping grooves 239 that circulate and pressurize fluid along the working regions 232, 234, 236 of the bearing 230. To facilitate re-circulation of bearing fluid, at least one or more circulation passages 250 and an optional reservoir 252 are formed within at least one of the shaft 202, the sleeve 222 and the carrier member 220. At least one of the one or more circulation passages 250 provides for independent flow of bearing fluid through the journal bearing components for the purpose of decoupling the individual bearing forces.

The spindle motor 200 further includes a thrust bearing 244 that includes the axial working surfaces 234 and 236 of the hydrodynamic bearing 230. The thrust bearing 244 includes a thrust plate 246 coupled to the shaft 202 and a counter plate 248 coupled to the rotating sleeve 222. The thrust plate 246 and counter plate 248 cooperate to form the upper working region 234 while the thrust plate 246 and an upper surface 290 of the sleeve 222 cooperate to form the lower working region 236. At least one of the two surfaces respectively defining the upper and lower working regions 234, 236 of the thrust bearing 244 includes grooves (shown by chevrons 298) to pressurize and assist fluid movement through the thrust bearing 244. The upper and lower working regions 234, 236 of the thrust bearing 244 provide axial stability for the hydrodynamic bearing 230 and position the hub 204 relative to the shaft 202 within the spindle motor 200. The present invention is useful with this and other forms of fluid dynamic bearings and is not limited to use with this particular configuration.

FIG. 3 depicts the thrust plate 246 and the counter plate 248 in greater detail. The thrust plate 246 includes a cylindrical section 302 having a flange 304 extending radially therefrom. An inner diameter 306 of the cylindrical section 302 is coupled to the second end 210 of the shaft 202. The inner diameter 306 may be configured to press fit on the shaft 202, or alternatively fixed by welding, staking or bonding among other coupling methods. In one embodiment, the shaft 202 includes a step 310 that provides a surface perpendicular to the shaft 202 for a lower surface 308 of the cylindrical section 302 to abut against, thereby positioning the thrust plate 246 relative to the shaft 202 and providing a stable and oriented mounting surface.

The flange 304 is generally oriented perpendicular to the shaft 202 and includes upper and lower surfaces 312, 314. The lower surfaces 314, 308 may be coplanar. The upper and lower surfaces 312, 314 define one side of the upper and lower working surfaces 234, 236 of the thrust bearing 244.

A passage 316 is formed through the flange 304 between the upper and lower surfaces 312, 314 radially inward of the pumping grooves (shown as chevrons 298) to allow fluid to move between the working surfaces 234, 236. In one embodiment, the angular orientation of the passage 316 is substantially parallel relative to the axis of the shaft 202

The counter plate 248 is generally an annular body coupled to the hub 204. The counter plate 248 includes an outer diameter 332, an inner diameter 334, an upper surface 336 and a lower surface 338. In one embodiment, the outer diameter 332 is at least partially disposed in a pocket of the sleeve 222 so that the lower surface 332 of the counter plate 248 faces the upper surface 312 of the flange 304 to form the upper axial working surface 236 of the thrust bearing 244. As previously described, at least one of each pair of facing surfaces 312, 338 and 314, 290 respectively defining the upper and lower working regions 234, 236 of the thrust bearing 244 includes pumping grooves (shown by chevrons 298) to pressurize and assist fluid movement through the thrust bearing 244, while the hole passage 316 formed through the flange 304 allows the bearing fluid to be re-circulated.

A capillary seal 340 is formed between an outer diameter 342 of the cylindrical section 302 of the thrust plate 246 and the inner diameter 334 of the counter plate 248. The divergent axial orientation and spacing between the outer diameter 342 of the cylindrical section 302 of the thrust plate 246 and the inner diameter 334 of the counter plate 248 is configured to promote capillary force between the bearing fluid, thrust plate 246 and counter plate 248, thereby preventing the fluid from exiting the motor 200.

In one embodiment, the capillary seal 340 is axially oriented and at least partially aligned with the passage 316 formed through the flange 304. This orientation of the seal 340 and passage 316 (relative to the axis of the shaft 202) allows for air entrained in the fluid re-circulating through the bearing 230 to exit through the seal 340. Elimination of air from the hydrodynamic bearing 230 advantageously enhances motor operation and contributes to the elimination of undesirable vibration. Moreover, as depicted in the embodiment of FIG. 3, the passage 316 may additionally be at least partially aligned with the recirculation hole 250 formed through the sleeve 222, the passage 316 facilitate purging of air from the reservoir 252 and other internal locations.

In one embodiment, at least one of the outer diameter 342 of the cylindrical section 302 of the thrust plate 246 and the inner diameter 334 of the counter plate 248 is oriented at an acute angle relative to the second end 210 of the shaft 202. The acute angle ensures that the centrifugal force upon the bearing fluid within the capillary seal 340 urges the fluid toward the thrust plate 246, thereby preventing leakage during operation.

In another embodiment, the outer diameter 342 of the cylindrical section 302 of the thrust plate 246 and the inner diameter 334 of the counter plate 248 are oriented at an acute angle, flaring the gap defining the capillary seal 340 toward the cover 104. The flared orientation of the capillary seal 340 resists movement of the fluid away from the lower surface 338 of the counter plate 248, thereby enhancing the performance of the fluid seal.

Thus, a spindle motor for a disc drive data storage device has been provided that advantageously reduces vibrations and/or acoustic levels in the storage device. In another aspect of the invention, a spindle motor for a disc drive data storage device is provided having an improved fluid dynamic bearing, advantageously facilitating addition of bearing fluid to the motor without motor disassembly. In another aspect of the invention, an improved fluid dynamic bearing includes an asymmetric seal that has a grooved pumping seal near the lower end of the shaft and a capillary seal near the upper end of the shaft. The bearing may additionally include at least one first fluid re-circulation path and at least one second fluid re-circulation path. The first re-circulation path provides for independent flow of the bearing fluid through the fluid dynamic bearing for the purpose of decoupling individual bearing forces. The second fluid re-circulation path provides for flow of the bearing fluid from the fluid dynamic bearing to the capillary seal for the purpose of purging any ingested air from the bearing fluid.

Other advantages present in some embodiments of the invention include a capillary seal formed integrally between the thrust and counter plates of the spindle motor, recirculation holes formed through the thrust plate to equalize asymmetry between the upper and lower surfaces of the thrust bearing, sleeve recirculation passage that allows fluid (e.g., oil) flow while promoting the purging of air from the fluid due to pressure differences between the upper and lower journals and the ambient environment through the capillary seal. Moreover, the incorporation of the capillary seal defined between the thrust and counter plates allows for smaller shaft diameters, which advantageously reduces power loss in the bearings and shaft cost.

Although the invention has been described with reference to preferred embodiments, workers skilled in the art will recognize that changes may be made in form and detail without departing from the spirit and scope of the invention.

What is claimed is:

1. A motor comprising:
   a stationary shaft;

a hub comprising a rotor, wherein the hub is rotatable about the central axis with respect to the shaft;

a thrust plate coupled to the shaft; and a counter plate coupled to the hub and having the shaft extending therethrough, the counter plate and the thrust plate defining at least a portion of a fluid dynamic bearing, wherein at least a portion of the counter plate and the thrust plate form an axially oriented capillary seal therebetween, wherein:

the thrust plate further comprises an upper surface at least partially facing the counter plate, a lower surface at least partially facing the hub, and a passage formed between the upper and lower surfaces and at least partially aligning with the capillary seal, and the hub further comprises a fluid re-circulation hole formed therein at least partially aligning with the passage formed in the thrust plate.

2. The motor of claim 1 further comprising a base having a first end of the stationary shaft coupled thereto; and a cover plate coupled to base and having a second end of the stationary shaft coupled thereto.

3. The motor of claim 1, wherein the thrust plate further comprises:

an outer surface facing and diverging from an inner surface of the counter plate.

4. The motor of claim 1, wherein at least one of the hub and thrust plate further comprises:

a plurality of pumping grooves formed therein radially outward of the passage.

5. The motor of claim 1 further comprising:

an asymmetric seal comprising a grooved pumping seal near a lower end of the shaft and the capillary seal near an upper end of the shaft.

6. The motor of claim 1, wherein the thrust plate further comprises:

a cylindrical portion coupled to the shaft; and a flange extending radially outward from the cylindrical portion.

7. The motor of claim 6, wherein the flange of the thrust plate further comprises:

an upper surface at least partially facing a bottom surface of the counter plate; and a lower surface facing a working surface of the hub.

8. The motor of claim 1 further comprising a hydrodynamic bearing defined between the hub and the shaft.

9. A motor comprising:

a base;

a cover coupled to the base;

a stationary shaft coupled to the base at a first end and coupled to the cover at a second end;

a hub comprising a rotor, wherein the hub is rotatable about the central axis with respect to the shaft;

a fluid dynamic bearing defined the hub with the shaft;

a thrust plate coupled to the shaft;

a counter plate coupled to the hub;

a divergent capillary seal defined between the thrust plate and the counter plate, wherein the capillary seal is defined between an outer surface of the thrust plate and an inner surface of the counter plate; and a stator coaxial with the shaft for rotating the hub relative to the shaft.

10. The motor of claim 9, wherein at least one of the outer diameter surface of the thrust plate and the inner diameter surface of the counter plate is oriented at an acute angle relative to the second end of the shaft.

11. The motor of claim 9, wherein an interface between an outer surface of the thrust plate and an inner surface of the counter plate is flared.

12. The motor of claim 9, wherein the thrust plate further comprises:

a cylindrical portion coupled to the shaft; and a flange extending radially outward from the cylindrical portion.

13. The motor of claim 12, wherein the flange of the thrust plate further comprises:

an upper surface at least partially facing a bottom surface of the counter plate;

a lower surface facing a working surface of the hub; and a passage formed between the upper surface and lower surface; the passage at least partially aligning with the capillary seal.

14. The motor of claim 13, wherein the flange of the thrust plate further comprises:

at least one re-circulation hole formed in the hub and at least partially aligned with the passage.

15. The motor of claim 13, wherein at least one of the hub and thrust plate further comprises:

a plurality of pumping grooves formed therein radially outward of the passage.

16. A motor comprising:

a stationary shaft;

a hub comprising a rotor, wherein the hub is rotatable about the central axis with respect to the shaft;

a thrust plate coupled to the shaft; and a counter plate coupled to the hub and having the shaft extending therethrough, the counter plate and the thrust plate defining at least a portion of a fluid dynamic bearing, wherein at least a portion of the counter plate and the thrust plate form an axially oriented capillary seal therebetween, and wherein the thrust plate further comprises an outer surface facing and diverging from an inner surface of the counter plate.

17. The motor of claim 16, wherein the thrust plate further comprises an upper surface at least partially facing the counter plate, a lower surface at least partially facing the hub, and a passage formed between the upper and lower surfaces and at least partially aligning with the capillary seal.

18. The motor of claim 17, wherein the hub further comprises a fluid re-circulation hole formed therein at least partially aligning with the passage formed in the thrust plate.

* * * * *